United States Patent
King et al.

(10) Patent No.: US 12,397,798 B2
(45) Date of Patent: Aug. 26, 2025

(54) METHOD AND DEVICE FOR DETERMINING LONGITUDINAL TIRE STIFFNESS

(71) Applicant: ZF Friedrichshafen AG, Friedrichshafen (DE)

(72) Inventors: Julian King, Rankweil (AT); Ulrich Mair, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 182 days.

(21) Appl. No.: 18/152,216

(22) Filed: Jan. 10, 2023

(65) Prior Publication Data
US 2023/0219574 A1    Jul. 13, 2023

(30) Foreign Application Priority Data
Jan. 13, 2022 (DE) .......................... 102022200305.5

(51) Int. Cl.
*B60W 30/20*    (2006.01)
*B60W 40/10*    (2012.01)
*B60W 40/12*    (2012.01)

(52) U.S. Cl.
CPC ........ *B60W 30/20* (2013.01); *B60W 40/105* (2013.01); *B60W 40/12* (2013.01);
(Continued)

(58) Field of Classification Search
CPC ............. B60W 30/20; B60W 2520/28; B60W 2710/0666; B60W 2710/083
(Continued)

(56) References Cited

U.S. PATENT DOCUMENTS 5,777,220 A * 7/1998 Matrascia ........... G01M 17/022
                                                        73/146
5,811,672 A * 9/1998 Mancosu .............. B60C 99/006
                                                        73/146
(Continued)

FOREIGN PATENT DOCUMENTS

DE    10 2004 032730 A1    2/2006
DE    10 2007 052751 A1    5/2009
(Continued)

OTHER PUBLICATIONS

De Pinto, Stefano et al. "On the Comparison of 2- and 4-Wheel-Drive Electric Vehicle Layouts with Central Motors and Single- and 2-Speed Transmission Systems." Energies 13.13 (2020): 3328—. Web. (Year: 2020).*
(Continued)

*Primary Examiner* — Ramya P Burgess
*Assistant Examiner* — Keith A von Volkenburg
(74) *Attorney, Agent, or Firm* — Crowell & Moring LLP

(57) ABSTRACT

A method for determining a longitudinal tire stiffness ($K_x$) for at least one wheel on a motor vehicle while the motor vehicle is in operation, may include generating a sinusoidal modulation of an axle drive torque or wheel drive torque necessary for maintaining the current vehicle speed (v), or a braking torque or recuperation torque necessary for maintaining the current braking power in at least one wheel for a sinusoidal excitation of a wheel rotational rate ($\omega$), such that a sinusoidal oscillation in the wheel rotational rate is induced. The method may also include detecting the resulting sinusoidal oscillation in the wheel rotational rate, determining the amplitude ($\omega_{amp}$) of the oscillation in the wheel rotational rate induced, and determining longitudinal tire stiffness ($K_x$) from the amplitude ($\omega_{amp}$). A corresponding apparatus for carrying out the method may be included.

15 Claims, 3 Drawing Sheets

(52) U.S. Cl.
CPC . *B60W 2520/28* (2013.01); *B60W 2710/0666* (2013.01); *B60W 2710/083* (2013.01)

(58) Field of Classification Search
USPC ............................................................ 701/1
See application file for complete search history.

(56) References Cited

U.S. PATENT DOCUMENTS

| | | | | |
|---|---|---|---|---|
| 5,853,509 | A * | 12/1998 | Boiocchi | B60C 3/04 |
| | | | | 152/526 |
| 6,904,351 | B1 * | 6/2005 | Hac | B60T 8/172 |
| | | | | 180/197 |
| 2018/0231577 | A1 * | 8/2018 | Karlsson | G01P 3/54 |

FOREIGN PATENT DOCUMENTS

| | | | | |
|---|---|---|---|---|
| JP | 2006034012 A | * | 2/2006 | |
| WO | WO2001019654 A1 | * | 6/2002 | |
| WO | WO-2005005174 A1 | * | 1/2005 | ........... B60C 23/061 |

OTHER PUBLICATIONS

Trudnowski, Daniel J, and Ross Guttromson. "A Strategy for Forced Oscillation Suppression." IEEE transactions on power systems 35.6 (2020): 4699-4708. Web. (Year: 2020).*

Hans B. Pacejka. "Chapter 12—Tire Steady-State and Dynamic Test Facilities." Tire and Vehicle Dynamics. Third Edition. Elsevier Ltd, 2012. 567-576. Web. (Year: 2012).*

DePinto,Stefano et al."OntheComparisonof2-and4-Wheel-DriveElectricVehicleLayoutswithCentral MotorsandSingle- and 2-SpeedTransmissionSystems." Energies13.13(2020):3328—. (Year: 2020).*

Hans B. Pacejka. "Chapter 12—Tire Steady-State and Dynamic Test Facilities." Tire and Vehicle Dynamics. Third Edition. Elsevier Ltd, 2012. 567-576. Web. (Year: 2012).*

Yim, Seongjin. "Comparison among Active Front, Front Independent, 4-Wheel and 4-Wheel Independent Steering Systems for Vehicle Stability Control." Electronics 9.5 (2020): 798—. Web. (Year: 2020).*

Trudnowski,DanielJ,and RossGuttromson."AStrategyforForcedOscillationSuppression." IEEEtransactionsonpower systems 35.6(2020):4699-4708.Web. (Year: 2020).*

* cited by examiner

METHOD AND DEVICE FOR DETERMINING LONGITUDINAL TIRE STIFFNESS

RELATED APPLICATION

This application claims the benefit of, and priority to, German Patent Application DE 10 2022 200 305.5, filed Jan. 13, 2022, which is hereby incorporated by reference herein in its entirety.

TECHNICAL FIELD

The invention relates to a method and a device for determining longitudinal tire stiffness for at least one wheel on a motor vehicle during operation thereof. The invention also relates to a motor vehicle in which such a method can be implemented and has such a device.

BACKGROUND

Tires have a so-called stiffness. This stiffness is a value in mechanical engineering and describes the resistance of a body, in this case the tire, to elastic deformation caused by a force or torque. A tire with a high level of stiffness is less resilient, and therefore transfers any unevenness in the road more strongly than softer tires.

The longitudinal tire stiffness of a wheel in particular is an important factor, especially with the use of driver assistance systems.

The determination of longitudinal stiffness in a tire normally takes place through a correlation between longitudinal tire slippage and the longitudinal tire forces obtained with a Kalman filter or recursive least squares algorithms. Slippage can be understood to be the deviation between wheel rotations in relation to the overall distance travelled, i.e. in general, this refers to the deviations in speeds between mechanical elements that are in frictional contact to one another when subjected to a load.

A common element in prior approaches is that a certain tire slippage or excitation must be exceeded to ensure a reliable estimation of the longitudinal tire stiffness.

DE 10 2004 032730 A1 discloses a method for determining longitudinal tire stiffness for use in a longitudinal dynamics or driving stability regulating system in a motor vehicle, in which the traction of a driven or braked vehicle wheel or driven or braked vehicle axle is set in relation to the driving or braking slippage at this wheel or axle, in which an interference effect resulting from a longitudinal tilt in the road surface or a tilt in the vehicle structure, substantially over the lateral axis of the vehicle, is eliminated.

DE 10 2007 052751 A1 discloses a method for determining longitudinal tire stiffness for use in a vehicle control system that acts on the operating state of the vehicle, comprising the following steps: determining a wheel speed from the measurement values obtained from at least one wheel rotational rate sensor, and determining a comparison speed, calculating the current actual wheel slippage from the wheel speed and the comparison speed, and calculating the longitudinal tire stiffness from a previously determined longitudinal tire force and the current actual wheel slippage.

BRIEF DESCRIPTION OF THE DRAWINGS

Further properties and advantages of the present invention can be derived from the following description in reference to the drawings. Therein.

DETAILED DESCRIPTION

Figure 1:
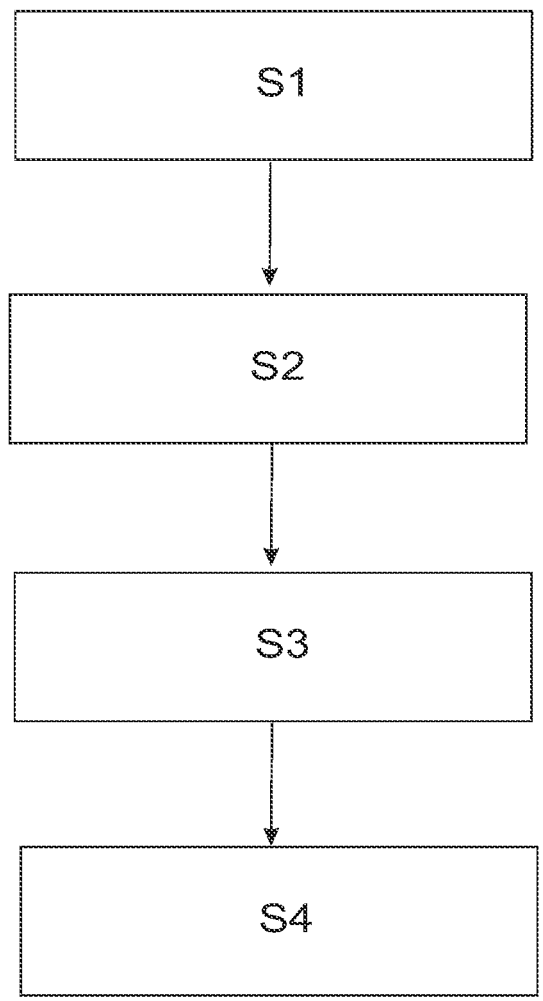
FIG. 1: shows a schematic illustration of the method according to the invention.

One object of the invention is to therefore create an improved method and improved device for determining longitudinal tire stiffness. It is also the object of the invention to produce a vehicle with which such a method can be implemented, or which has such a device.

These objects are achieved with a method that has the features in claim 1 and a device that has the features in claim 10, as well as a motor vehicle that has the features in claim 15.

Advantageous developments of the invention are described in the dependent claims and the following description, and illustrated in the drawings.

The first problem is solved by a method for determining longitudinal tire stiffness in at least one wheel on a motor vehicle during operation of the motor vehicle, comprising the steps:

generating a sinusoidal modulation of an axle drive torque or wheel drive torque necessary for maintaining the current vehicle speed, or a braking torque or recuperation torque necessary for maintaining the current braking power in at least one wheel for a sinusoidal excitation of a wheel rotational rate, such that a sinusoidal oscillation in the wheel rotational rate is induced, detecting the resulting sinusoidal oscillation in the wheel rotational rate, determining the amplitude of the oscillation in the wheel rotational rate induced in this manner, and determining longitudinal tire stiffness from the amplitude.

According to the invention, a sinusoidal excitation of the wheel rotational rate(s) is induced through a sinusoidal modulation of a mean/constant wheel drive torque or axle drive torque necessary for maintaining the current driving speed, or a braking torque or recuperation torque necessary for maintaining the current braking power. This induces a sinusoidal oscillation in the wheel rotational rate. It has been realized in accordance with the invention that a first approximation of the amplitude of the oscillation in the wheel rotational rate in a wheel induced in this manner is indirectly proportional to the longitudinal tire stiffness.

It has therefore been realized according to the invention that the wheel rotates at different rates through the modulation of the drive torque or wheel drive torque, depending on the longitudinal tire stiffness. The same is the case with modulation of the braking torque or recuperation torque.

The longitudinal tire stiffness of a wheel can be determined with the invention without calculating the tire slippage. In particular, this can also be determined without accelerating the vehicle. There is also no need for a complex supplementary sensor system for determining the precise vehicle reference speed and the slippage.

By detecting the amplitude of the change in rotational rate, i.e. the oscillation in the wheel rotational rate induced in this manner, the longitudinal tire stiffness can therefore be easily determined according to the invention.

The sinusoidal modulation can take place as a torque modulation.

The wheel rotational rate oscillation can be a torque oscillation.

The invention can also be used in general in all-wheel drive vehicles or passenger automobiles, or in commercial or railway vehicles.

In another embodiment, the frequency of the sinusoidal modulation can be selected arbitrarily. The frequency of the torque modulation can be selected arbitrarily and can therefore be placed in a range of the spectrum that is unaffected by other factors, although existing physical limitations, for example, must still be taken into account. If the sinusoidal modulation is applied, for example, using a torque generator, gradient limitations for the torque generator are to be taken into account.

In another embodiment, a sinusoidal modulation of the axle drive torque or wheel drive torque, or the braking torque or recuperation torque, is induced in at least one pair of wheels on opposite sides of the vehicle. The pair of wheels in this case comprise either the front wheels or the rear wheels in particular.

In another embodiment, complementary sinusoidal modulations of the axle drive torque or wheel drive torque, or complementary sinusoidal modulations of the braking torque or recuperation torque are induced in the wheel pair, such that the respective sinusoidal wheel rotational rate oscillations cancel each other out. The overall drive or overall braking torques remain substantially constant at the vehicle level in this case.

Through the mutual cancellation of the sinusoidal wheel rotational rate oscillation, the vehicle operator experiences no significant change in speed. Driving comfort is not compromised as a result. This is of particular advantage when the longitudinal tire stiffness is determined frequently.

Alternatively, the sinusoidal modulation of the axle drive torque or wheel drive torque, or the braking torque or recuperation torque, can also be induced in pairs of wheels on axles at opposite ends of the vehicle. In particular, complementary sinusoidal modulation can be induced in pairs of wheels on axles at opposite ends of the vehicle such that the overall drive or overall braking torques remain substantially constant at the vehicle level, in that the respective sinusoidal wheel rotational rate oscillations substantially cancel each other out. This means that a sinusoidal modulation of the axle drive torque or wheel drive torque, or the brake torque or recuperation torque, is induced in both rear wheels, and complementary sinusoidal modulations of the axle drive torque or wheel drive torque, or the braking torque or recuperation torque are induced in the front wheels, such that the overall sinusoidal modulations of the axle drive torque or wheel drive torque, or braking torque or recuperation torque at the front and rear axles cancel each other out.

Through the mutual cancellation of the sinusoidal wheel rotational rate oscillation, the driver experiences no significant change in speed. Driving comfort is not compromised as a result. This is of particular advantage when the longitudinal tire stiffness is determined frequently.

In particular, the friction coefficient potential can be determined from the longitudinal tire stiffness. Consequently, the friction coefficient potential can also be determined without tire slippage. In particular with autonomous vehicles, a constant determination of the friction coefficient potential is necessary for ensuring the operational safety of the motor vehicle. This constant determination of the friction coefficient potential is indispensable in particular in dangerous situations, because the friction coefficient potential must be used there in order for the vehicle to handle optimally, in particular with regard to setting an optimal speed with respect to braking distance and vehicle stability.

In another embodiment, the amplitude of the resulting wheel rotational rate oscillation can be determined with a frequency analysis of the wheel rotational rate oscillation, i.e. a conclusion can be drawn regarding the longitudinal tire stiffness by detecting the amplitude of the change in rotational rate with a frequency analysis of the wheel rotational rate oscillation. Such a frequency analysis is simple and can be carried out quickly.

Furthermore, the vehicle can be operated substantially without acceleration, i.e. the vehicle can roll freely, without acceleration, and without any, or with very little, slippage.

The object of the invention is also achieved with a device for determining longitudinal tire stiffness in at least one wheel on a motor vehicle while the motor vehicle is in operation, which contains a control unit that is configured to generate a sinusoidal modulation of an axle drive torque or wheel drive torque necessary for maintaining the current vehicle speed, or a braking torque or recuperation torque necessary for maintaining the current braking power in at least one wheel for a sinusoidal excitation of the wheel rotational rate, such that a sinusoidal wheel rotational rate oscillation is obtained, and a sensor system for detecting the resulting sinusoidal wheel rotational rate oscillation, as well as an evaluation unit for determining the amplitude from the detected wheel rotational rate oscillation that has been detected and to determine a longitudinal tire stiffness from the amplitude of the induced wheel rotational rate oscillation that has been determined.

The control unit can also be the torque generator, for example, or the control unit can cause this modulation through the use of a torque generator.

The advantages of the method can also be applied to the device. In particular, the method can be carried out on the device. The frequency of the torque modulation can be selected arbitrarily in principle, and thus placed in a range of the spectrum that is unaffected by other factors, wherein physical limitations of the torque generator are to be taken into account, for example.

In another embodiment, the control unit is configured to induce complementary sinusoidal modulations of the axle drive torque or wheel drive torque, or complementary sinusoidal modulations of the braking torque or recuperation torque, on pairs of wheels on opposite sides of the vehicle such that the respective induced sinusoidal torque modulations substantially cancel each other out.

The control unit can also be configured to induce complementary sinusoidal modulations in wheels on axles at opposite ends of the vehicle, such that the sinusoidal wheel rotational rate oscillations substantially cancel each other out.

This prevents a change in speed. Consequently, the longitudinal tire stiffness, and thus the friction coefficient potential, can be determined on a frequent basis, without the driver noticing.

The evaluation unit can also be configured to determine the friction coefficient potential from the longitudinal tire stiffness.

The control unit is preferably configured to drive each wheel with a separate electric motor or engine. The device is designed in particular for use in electric busses or other electric vehicles in which a separate electric motor is used for each wheel/axle. If electric motors are used for the modulation of the axle drive torque or wheel drive torque, these torques can be set or modified precisely, because these motors can modify the torques more quickly and precisely than an internal combustion engine.

The object of the invention is also achieved by a motor vehicle in which the method described above is implemented, and/or that has the device described above, in which the motor vehicle has at least one electric motor.

In addition to passenger automobiles, the device and/or method can also be used in commercial vehicles or railway vehicles.

Referring now to the figures, FIG. 1 shows a method for determining a longitudinal tire stiffness $K_x$ for at least one wheel 1 on a motor vehicle 2 while the vehicle 2 is in operation, according to the invention.

In the first step S1, a sinusoidal excitation of the wheel rotational rate(s) is induced through a sinusoidal modulation of a wheel drive torque or axle drive torque necessary to maintain the current driving speed, thus generating a sinusoidal wheel rotational rate oscillation.

In particular, wheels on opposite sides, e.g. the front or rear wheels, are subjected to complementary modulations, which cancel each other out. This prevents changes in speed. These separate modulations can be readily obtained in particular with individual wheels that are powered separately, e.g. in electric busses or electric vehicles that have separate motors.

Instead of a sinusoidal modulation of the axle drive torque or wheel drive torque, it is also possible to modulate the braking torque or recuperation torque.

The resulting wheel rotational rate oscillation is subsequently detected in the second step S2. This can be achieved using a rotational rate sensor.

The amplitude $\omega_{amp}$ is determined in the third step S3 from the wheel rotational rate oscillation, i.e. the change in rotational rate, e.g. via frequency analysis.

The change in rotational rate, i.e. the sinusoidal wheel rotational rate oscillation, can be described by the following equation:

$$\dot{\omega} = \frac{1}{J}(M_0 + M_{amp}\sin(kt) - F_x r) = \frac{1}{J}\left(M_0 + M_{amp}\sin(kt) - K_x \frac{(\omega r - v)}{v} r\right)$$

where:
r=tire radius [m]
J=moment of inertia for the wheel [kgm2]
$K_x$=longitudinal tire stiffness [N/m]
$F_x$=longitudinal tire force [N]
$M_0$=constant (mean) drive torque [Nm]
$M_{amp}$=Amplitude of the modulated wheel torque [Nm]
k=frequency scaling factor for the modulated drive/wheel torque [−]
v=vehicle speed [m/s]
ω=wheel rotational rate [r/s]
$\omega_{amp}$=Amplitude of the induced wheel rotational rate oscillation [r/s]

Figure 2:
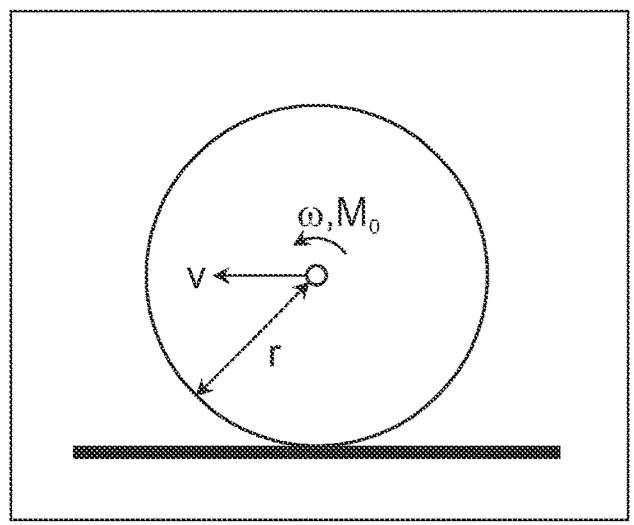
FIG. 2: shows a schematic illustration of various factors that affect a moving wheel.

FIG. 2 shows the wheel rotational rate ω the vehicle speed v the drive torque $M_0$ and the tire radius r for a moving wheel 1.

Assuming a constant driving speed, and sufficiently small frequency scaling factors k, the following approximation is obtained for the above equation:

$$\omega_0 + \frac{M_{amp} v}{K_x r^2}\sin(kt) = \omega_0 + \omega_{amp}\sin(kt) k \ll \left(\frac{K_x r^2}{Jv}\right)$$

Such that the amplitude $\omega_{amp}$ of the wheel rotational rate oscillation in the first approximation is indirectly proportional to the longitudinal tire stiffness $K_x$:

$$K_x \approx \frac{M_{amp} v}{\omega_{amp} r^2}$$

The wheel therefore experiences different changes in rotational rate due to the modulation of the drive/wheel/braking/recuperation torque, depending on the longitudinal tire stiffness $K_x$. The longitudinal tire stiffness $K_x$ can be determined by detecting the amplitude $\omega_{amp}$ of the change in rotational rate, e.g. using a frequency analysis of the wheel rotational rates.

Figure 3:
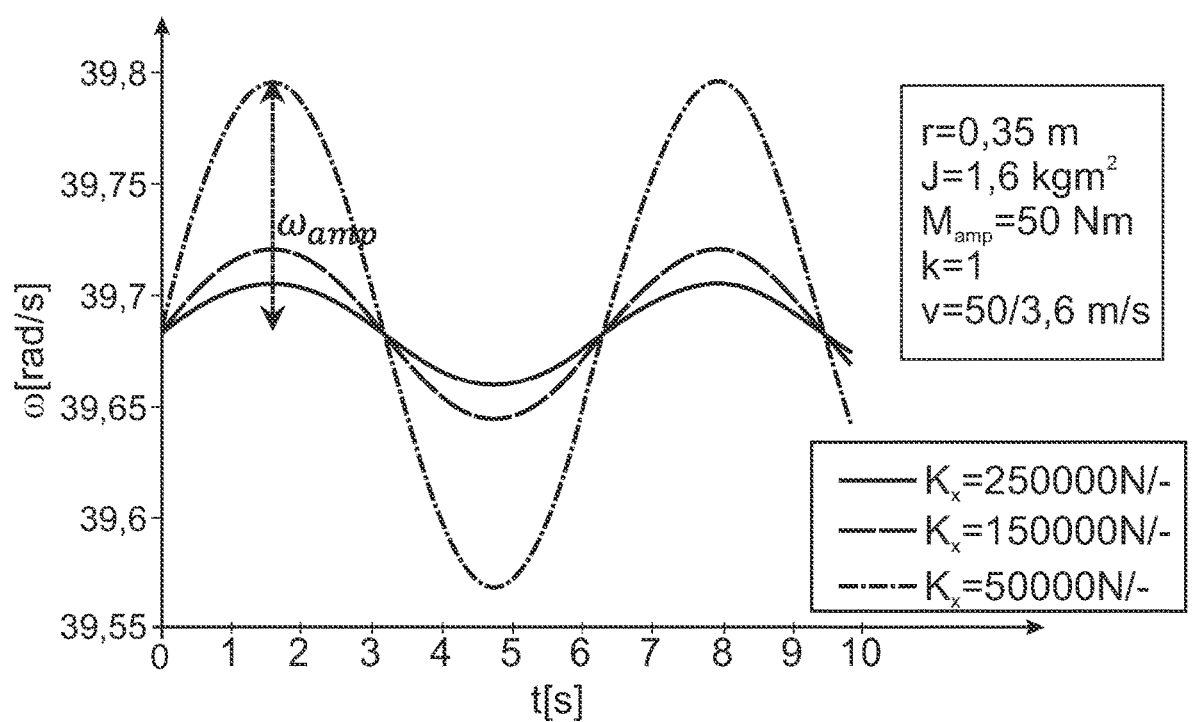
FIG. 3: shows a schematic illustration of a sinusoidal modulation and the wheel rotational rate oscillations resulting therefrom for different longitudinal tire stiffnesses.

FIG. 3 shows a sinusoidal modulation and the resulting wheel rotational rate oscillations of an axle drive torque or wheel drive torque necessary to maintain the current vehicle speed v for different longitudinal tire stiffnesses $K_x$.

The friction coefficient potential is subsequently determined in step S4 from the longitudinal tire stiffness $K_x$ obtained in this manner. This enables a determination of the friction coefficient potential without calculating the tire slippage. The method and calculation of the longitudinal tire stiffness $K_x$, and thus the friction coefficient potential, can subsequently be repeated in predefined time intervals.

This is necessary in particular in a highly automated motor vehicle to increase the motor vehicle safety. This is particularly indispensable in dangerous situations, because the friction coefficient potential must be known in these cases in order for the vehicle to handle optimally. Vehicle speed v in particular must be set on the basis of the friction coefficient in order to be able to establish an optimal braking distance in dangerous situations.

Figure 4:
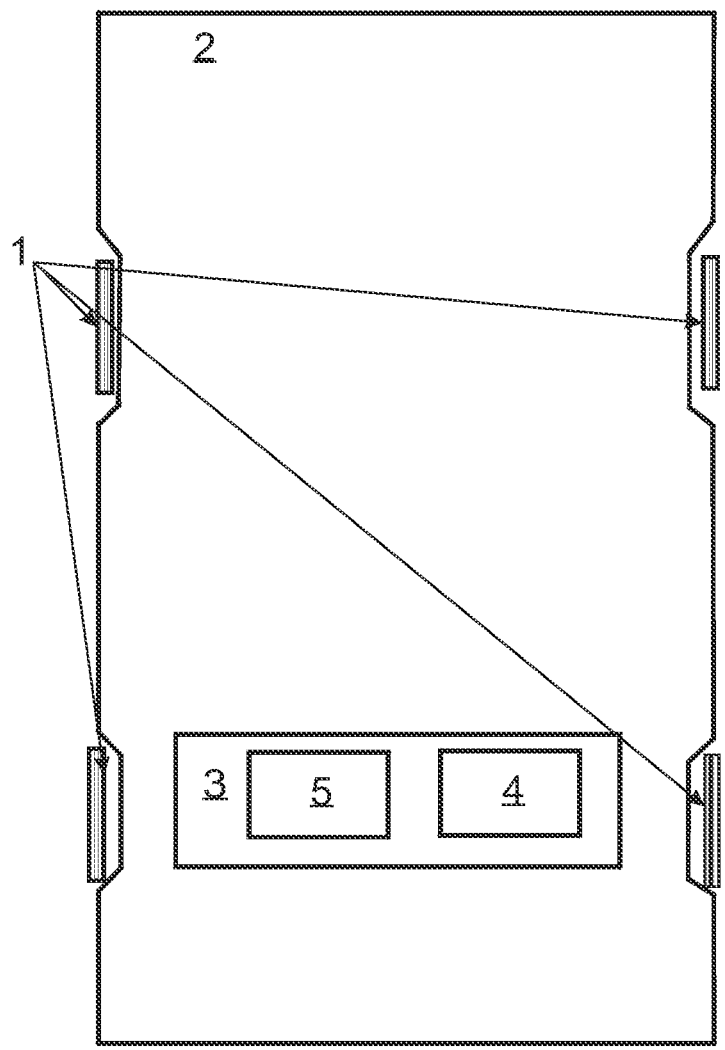
FIG. 4: shows a schematic illustration of a vehicle according to the invention.

FIG. 4 shows a motor vehicle 2 that has a device 3 for determining longitudinal tire stiffness for at least one wheel 1 on the motor vehicle 2 in accordance with the invention. The device 3 contains a control unit 5 for sinusoidal modulation of an axle drive torque or wheel drive torque necessary for maintaining the current vehicle speed v, with which a sinusoidal wheel rotational rate oscillation is induced in at least one wheel 1.

The control unit 5 can also generate a sinusoidal modulation of a braking torque or recuperation torque necessary for maintaining the current braking power in a least one wheel 1 for a sinusoidal excitation of a wheel rotational rate, with which a sinusoidal wheel rotational rate oscillation is induced.

The torques can be modulated in an electric vehicle in which it is possible to control the wheels 1 with separate electric motors in pairs of wheels on opposite sides of the vehicle such that the induced sinusoidal wheel rotational rate oscillations cancel each other out. This is also possible with other motor vehicles that have an individual wheel drive for each wheel, because one or more of the wheels on these motor vehicles normally has a separate drive in or on each wheel.

The sinusoidal wheel rotational rate oscillations therefore cancel each other out, such that the speed of the motor vehicle does not change, which in turn has a positive impact on driving comfort.

A torque generator controlled by the control unit 5 can be used for the modulation.

The resulting wheel rotational rate oscillations can be subsequently detected with a sensor system, e.g. a rotational rate sensor, based on the changes in rotational rates that are generated.

The device 3 also has an evaluation unit 4 for determining an amplitude $\omega_{amp}$ of the wheel rotational rate oscillations induced in this manner on the basis of a frequency analysis of the wheel rotational rates.

The evaluation unit 4 can determine the longitudinal tire stiffness $K_x$ of the wheel 1 from the amplitude $\omega_{amp}$ determined in this manner, because the amplitude $\omega_{amp}$ of the wheel rotational rate oscillations induced in this manner is indirectly proportional to the longitudinal tire stiffness $K_x$ in a first approximation.

The friction coefficient potential can then be determined by the evaluation unit 4 from the longitudinal tire stiffness $K_x$.

LIST OF REFERENCE SYMBOLS

1 wheel
2 motor vehicle
3 device
4 evaluation unit
control unit
r=tire radius [m]
J=moment of inertia for the wheel [kgm2]
$K_x$=longitudinal tire stiffness [N/m]
$F_x$=longitudinal tire force [N]
$M_0$=constant (mean) drive torque [Nm]
$M_{amp}$=Amplitude of the modulated wheel torque [Nm]
k=frequency scaling factor for the modulated drive/wheel torque [-]
v=vehicle speed [m/s]
$\omega$=wheel rotational rate [r/s]
$\omega_{amp}$=Amplitude of the induced wheel rotational rate oscillation [r/s]

We claim:

1. A method for determining a longitudinal tire stiffness ($K_x$) for at least one wheel on a motor vehicle while the motor vehicle is in operation, comprising:
    generating a sinusoidal modulation of at least one of an axle drive torque or wheel drive torque necessary for maintaining a current vehicle speed (v), and
    a braking torque or recuperation torque necessary for maintaining a current braking power in at least one wheel while the motor vehicle is in operation;
    causing movement of the at least one wheel with a sinusoidal excitation of a wheel rotational rate ($\omega$), in response to the generated sinusoidal modulation of torque, to induce a sinusoidal oscillation in the wheel rotational rate while the motor vehicle is in operation,
    detecting a resulting sinusoidal oscillation in the wheel rotational rate, determining an amplitude ($\omega_{amp}$) of the oscillation in the wheel rotational rate induced in this manner, and
    determining longitudinal tire stiffness ($K_x$) from the amplitude ($\omega_{amp}$), wherein
    the amplitude ($\omega_{amp}$) is indirectly proportional to the longitudinal tire stiffness ($K_x$).

2. The method according to claim 1, wherein a frequency of the sinusoidal modulation can be selected arbitrarily.

3. The method according to claim 1, wherein a sinusoidal modulation of the axle drive torque or wheel drive torque, or the braking torque or recuperation torque is induced on at least one pair of wheels on opposite sides of the vehicle.

4. The method according to claim 3, wherein at least one of complementary sinusoidal modulations of the axle drive torque or wheel drive torque and complementary sinusoidal modulations of the braking torque or recuperation torque are induced in pairs of wheels on opposite sides of the vehicle such that sinusoidal wheel rotational rate oscillations of the pairs of wheels substantially cancel each other out, and an overall drive and/or braking torque remains substantially constant at the vehicle level.

5. The method according to claim 1, wherein a sinusoidal modulation of the axle drive torque or wheel drive torque, or the braking drive torque or recuperation torque is induced on pairs of wheels on axles at opposite ends of the vehicle.

6. The method according to claim 5, wherein a sinusoidal modulation is induced in the pair of wheels on axles at opposite ends of the vehicle, such that respective sinusoidal wheel rotational rate oscillations of the pair of wheels substantially cancel each other out, and an overall drive and/or overall braking torque remains substantially constant at the vehicle level.

7. The method according to claim 1, wherein a friction coefficient potential is determined from the longitudinal tire stiffness ($K_x$).

8. The method according to claim 1, wherein the amplitude ($\omega_{amp}$) is determined based on a frequency analysis of the oscillation in the wheel rotational rate.

9. The method according to claim 1, wherein the motor vehicle is substantially operated without acceleration.

10. A motor vehicle, comprising:
    at least one processor configured to generate a sinusoidal modulation of at least one of an axle drive torque or wheel drive torque necessary for maintaining a current vehicle speed (v), or a braking torque or recuperation torque necessary for maintaining a current braking power in at least one wheel while the motor vehicle is in operation,
    a device comprising at least one of a motor, an engine, or a braking system, wherein the device is configured to cause movement of the at least one wheel with a sinusoidal excitation of a wheel rotational rate ($\omega$), in response to the generated sinusoidal modulation of torque, such that a sinusoidal wheel rotational rate oscillation is obtained in the at least one wheel while the motor vehicle is in operation; and
    a sensor system for detecting a resulting sinusoidal wheel rotational rate oscillation;
    wherein the at least one processor is further configured to determine an amplitude ($\omega_{amp}$) of the wheel rotational rate oscillation induced in this manner and to determine a longitudinal tire stiffness ($K_x$) for the wheel from the amplitude ($\omega_{amp}$) of the wheel rotational rate oscillation that has been induced, and wherein the amplitude ($\omega_{amp}$) is indirectly proportional to the longitudinal tire stiffness ($K_x$).

11. The motor vehicle according to claim 10, wherein the at least one processor is configured to induce at least one of complementary sinusoidal modulations of the axle drive torque or wheel drive torque, and complementary sinusoidal modulations of the braking torque or recuperation torque on a pair of wheels on opposite sides of the vehicle, such that these induced sinusoidal wheel rotational rate oscillations substantially cancel each other out.

12. The motor vehicle according to claim 10, wherein the at least one processor is configured to induce complementary sinusoidal modulations on a pair of wheels on axles at opposite ends of the vehicle such that these respective sinusoidal wheel rotational rate oscillations substantially cancel each other out, and an overall drive and/or overall braking torque remains substantially constant at the vehicle level.

13. The motor vehicle according to claim 10, wherein the at least one processor is configured to determine a friction coefficient potential from the longitudinal tire stiffness ($K_x$).

14. The motor vehicle according to claim 10, wherein the at least one processor is configured to control a power to each wheel with a separate electric motor or engine.

15. The motor vehicle according to claim 10, further comprising at least one electric motor.

\* \* \* \* \*